United States Patent
Hsieh et al.

(10) Patent No.: US 10,386,930 B2
(45) Date of Patent: *Aug. 20, 2019

(54) DEPTH DETERMINING METHOD AND DEPTH DETERMINING DEVICE OF OPERATING BODY

(71) Applicant: Wistron Corporation, New Taipei (TW)

(72) Inventors: Sheng-Hsien Hsieh, New Taipei (TW); Chih-Hsiung Chang, New Taipei (TW); Shou-Te Wei, New Taipei (TW)

(73) Assignee: Wistron Corporation, New Taipei (TW)

(*) Notice: Subject to any disclaimer, the term of this patent is extended or adjusted under 35 U.S.C. 154(b) by 69 days.

This patent is subject to a terminal disclaimer.

(21) Appl. No.: 14/990,802

(22) Filed: Jan. 8, 2016

(65) Prior Publication Data

US 2016/0116990 A1 Apr. 28, 2016

Related U.S. Application Data

(62) Division of application No. 14/187,335, filed on Feb. 24, 2014, now Pat. No. 9,766,708.

(30) Foreign Application Priority Data

Nov. 5, 2013 (TW) .............................. 102140174 A (51) Int. Cl.
  *G06F 3/01* (2006.01)
  *G06T 7/50* (2017.01)
  *G06T 7/593* (2017.01)

(52) U.S. Cl.
  CPC ................ *G06F 3/017* (2013.01); *G06T 7/50* (2017.01); *G06T 7/593* (2017.01)

(58) Field of Classification Search
  None
  See application file for complete search history.

(56) References Cited

U.S. PATENT DOCUMENTS

2008/0013826 A1* 1/2008 Hillis ...................... G06F 3/017
                                                                 382/154
2010/0134442 A1   6/2010 Yang et al.
(Continued)

FOREIGN PATENT DOCUMENTS

TW    201101197     1/2011
TW    103345301    10/2013

OTHER PUBLICATIONS

"Office Action of China Counterpart Application" with partial English translation, dated Jun. 20, 2016, p. 1-p. 11, in which the listed reference was cited.

(Continued)

*Primary Examiner* — Amr A Awad
*Assistant Examiner* — Donna V Lui
(74) *Attorney, Agent, or Firm* — JCIPRNET (57) ABSTRACT

A depth determining method and a depth determining device of an operating body are provided. The depth determining method includes following steps: deriving a first image and a second image that include the operating body from the at least two image capturing units respectively to calculate a first width of the operating body and a first displacement distance of the operating body between the first image and the second image in a first time point; deriving the first image and the second image that include the operating body from the at least two image capturing units respectively to calculate a second width of the operation body in a second time point; and calculating displacement depth of operating body between the first time point and the second time point by a transform function according to the first displacement (Continued)

distance and a different between the first width and the second width.

5 Claims, 7 Drawing Sheets

(56) References Cited

U.S. PATENT DOCUMENTS

2010/0329509 A1   12/2010   Fahn et al.
2012/0062729 A1*  3/2012    Hart ..................... G06F 1/1626
                                                        348/135
2014/0119599 A1*  5/2014    Dal Mutto ........... G06K 9/6202
                                                        382/103
2014/0333532 A1*  11/2014   Ohbitsu ............. G02B 27/2214
                                                        345/156

OTHER PUBLICATIONS

"Office Action of Taiwan Counterpart Application" with partial English translation, dated Dec. 15, 2015, p. 1-p. 13, in which the listed references were cited.

* cited by examiner

DEPTH DETERMINING METHOD AND DEPTH DETERMINING DEVICE OF OPERATING BODY

CROSS-REFERENCE TO RELATED APPLICATION

This application is a divisional application of and claims the priority benefit of a prior application Ser. No. 14/187,335, filed on Feb. 24, 2014, now pending. The prior application Ser. No. 14/187,335 claims the priority benefit of Taiwan application serial no. 102140174, filed on Nov. 5, 2013. The entirety of each of the above-mentioned patent applications is hereby incorporated by reference herein and made a part of this specification.

BACKGROUND

Field of the Invention

The invention generally relates to an electronic device, and in particular, to a depth determining method and a depth determining device of an operating body.

Description of Related Art

In recent years, with progress of science and technology, electronic devices have been extensively applied, and motion sensing devices characterized by interactions with users have also attracted a lot of attentions. Said motion sensing device captures a user's motions through a camera device and analyzes the captured user's motions so as to execute corresponding procedures. In order to analyze the user's motions, it is necessary to establish depth data of images.

Generally, if it is intended to establish the depth data of an image, a pre-set dual camera device may be applied to shoot images from different viewing angles to establish the depth data according to a parallax between two images. In the related art, the identification capability of said depth data may be influenced by the resolution of the camera device, the field of view and the baseline between two camera units, etc. Besides, if the operating body, such as a user's finger or arm, is away from said dual camera device, the operating body located between two images in the dual camera device may not have sufficient parallax, which may cause the motion sensing device not to be able to establish the depth data correctly according to a sufficient parallax to determine the exact and complete motion track of the operating body.

SUMMARY

The invention provides a depth determining method and a depth determining device of an operating body, so as to locate the position of the operating body correctly and enhance the accuracy of the depth data of the operating body by detecting imaging variations in the operating body (e.g., a human finger).

An embodiment of the invention provides a depth determining method of an operating body, and the depth determining method includes following steps. A first image and a second image that include the operating body are derived from at least two image capturing units respectively to calculate a first width of the operating body and a first displacement distance of the operating body between the first image and the second image in a first time point. The first image and the second image that include the operating body are derived from the at least two image capturing units respectively to calculate a second width of the operating body in a second time point. A displacement depth of the operating body between the first time point and the second time point is calculated by a transform function according to the first displacement distance and a difference between the first width and the second width.

An embodiment of the invention provides a depth determining device of an operating body, and the depth determining device includes a first image capturing unit, a second image capturing unit, and a processing unit. The first image capturing unit is configured to capture a first image that includes the operating body. The second image capturing unit is configured to capture a second image that includes the operating body. The processing unit is coupled to the first image capturing unit and the second image capturing unit. Here, the processing unit derives a first image and a second image that include the operating body from at least two image capturing units respectively to calculate a first width of the operating body and a first displacement distance of the operating body between the first image and the second image in a first time point. The processing unit derives the first image and the second image that include the operating body from the at least two image capturing units respectively to calculate a second width of the operating body in a second time point. The processing unit calculates a displacement depth of the operating body between the first time point and the second time point by a transform function according to the first displacement distance and a difference between the first width and the second width.

Based on the above, some embodiments of the invention provide the locating method and the locating device of the operating body. Specifically, the captured image is transversely scanned, and the scanned result is analyzed to derive the locating point of the operating body. Some embodiments of the invention provide the depth determining method and the depth determining device to calculate the displacement depth of the operating body according to the captured image between two time points.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In an embodiment of the invention, the operating body is an object which may be user's fingers, hands, arms, a tip of a pen held by a user, or similar elements that allow the user to interact with a motion sensing device (e.g., a motion sensing device which includes a locating device 10), but the invention is not limited thereto. However, in the invention, the position and the displacement of the operating body are obtained through an image capturing method, so as to further perform corresponding actions according to the position and the displacement of the operating body, e.g., motion sensing interactions, etc. Other objects (e.g., the user's body, etc.) in the image may be meaningless, and therefore the locating of the operating body may be the focus in the invention.

Figure 1:
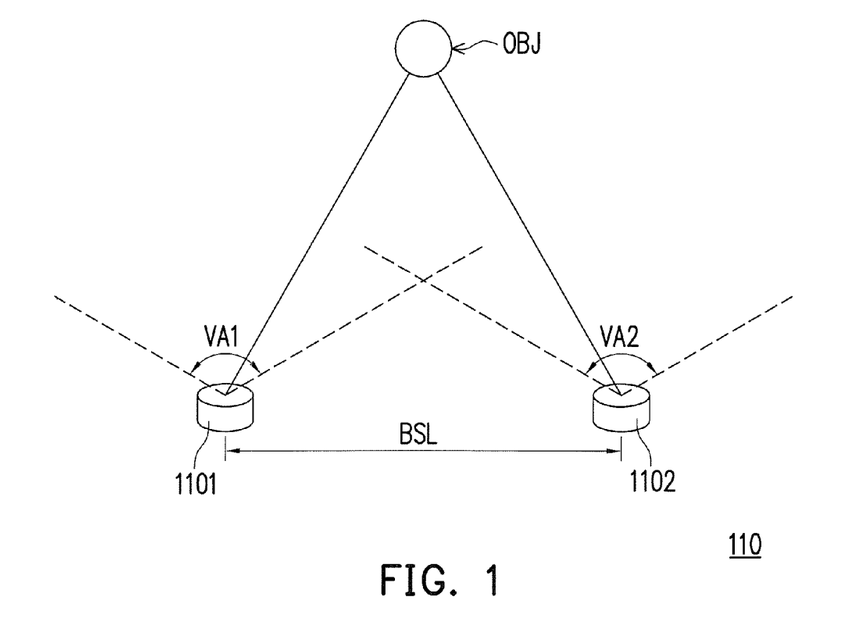
FIG. 1 is a schematic diagram illustrating relationship between an image capturing unit and an operating body according to an embodiment of the invention.

FIG. 1 is a schematic diagram illustrating relationship between an image capturing unit and an operating body according to an embodiment of the invention. With reference to FIG. 1, in the present embodiment, the image capturing unit 110 includes two image capturing devices 1101 and 1102, wherein there is a baseline BSL between the image capturing devices 1101 and 1102, and the image capturing devices 1101 and 1102 respectively have viewing angles VA1 and VA2. When the operating body OBJ falls into the viewing angles VA1 and VA2 of the image capturing devices 1101 and 1102, the processing unit connected to the image capturing unit 110 may locate the operating body OBJ. Said depth data are generated according to at least three factors: the dpi of the image capturing devices 1101 and 1102, the viewing angles VA1 and VA2 of the image capturing devices 1101 and 1102, and the baseline between the image capturing devices 1101 and 1102. For example, in an embodiment of the invention, the image capturing devices 1101 and 1102 may capture images whose resolution is 1280*720 pixels, the viewing angles VA1 and VA2 of the image capturing devices 1101 and 1102 are both 107 degrees, and the baseline BSL between the image capturing devices 1101 and 1102 is 5 cm. In this case, the operating body OBJ located at a distance of 60 cm in front of the image capturing devices 1101 and 1102 is required to move by 9.1 mm along the depth direction (e.g., the direction parallel to a perpendicular bisector of the connecting line between the operating body and the image capturing devices 1101 and 1102), such that a sufficient imaging parallax is between the images captured by the image capturing devices 1101 and 1102 and is able to be identified. Besides, the greater the distance from the operating body OBJ to the image capturing unit 110, the smaller the parallax generated by motions, and the less likely the imaging parallax is to be identified.

Figure 2:
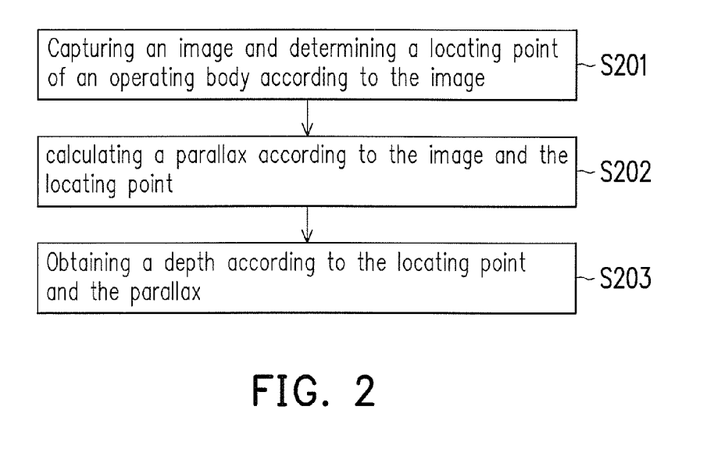
FIG. 2 is a flow chart illustrating a locating method of an operating body according to an embodiment of the invention.

In the invention, the locating method of the operating body may be divided into following steps. FIG. 2 is a flow chart illustrating a locating method of an operating body according to an embodiment of the invention. With reference to FIG. 2, in step S201, an image is captured by the image capturing unit 110, for instance, and a locating point of the operating body is determined according to the image. In step S202, the parallax between two image capturing devices 1101 and 1102 of the image capturing unit 110 may be calculated according to said image and the determined locating point. In step S203, the depth data may be derived according to said locating point and the parallax, and the variation of the depth of the operating body and the displacement thereof may be further derived when the operating body is moved along the depth direction (e.g., the direction parallel to the perpendicular bisector of the connecting line between the operating body and the capturing units 1101 and 1102). Each step described above will be illustrated with reference to the following drawings and embodiments in detail.

Figure 3:
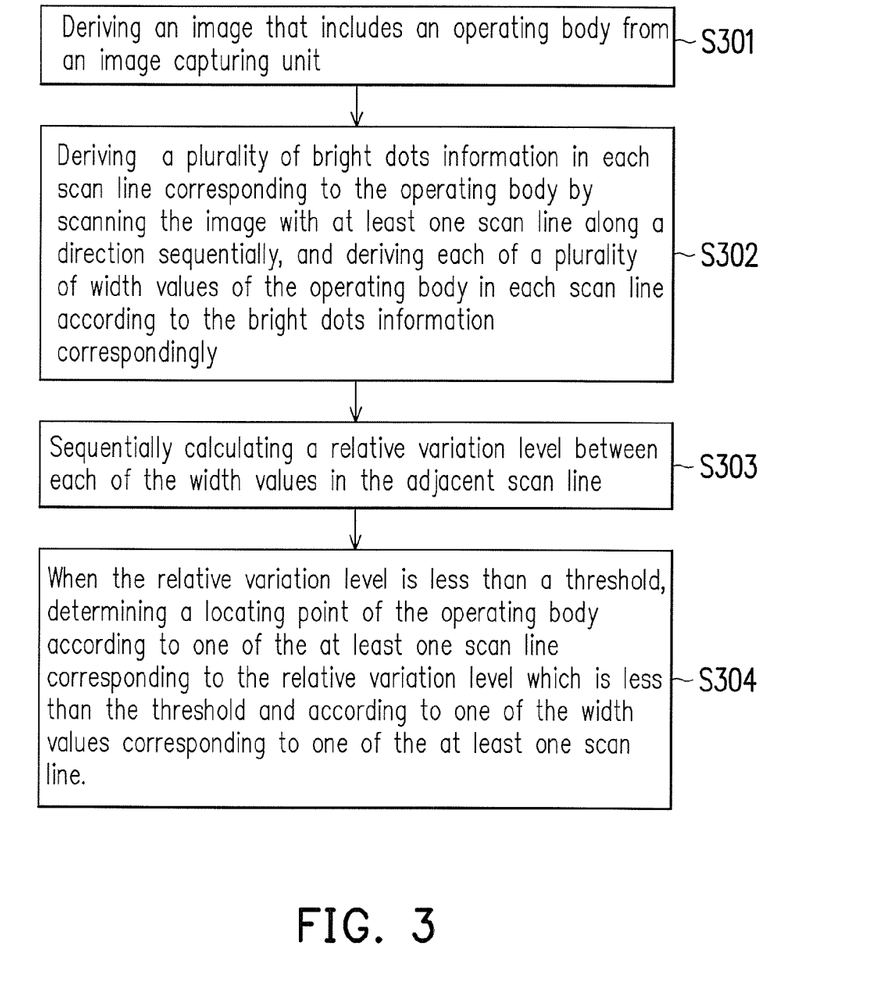
FIG. 3 is a flow chart illustrating a locating method of an operating body according to an embodiment of the invention.

FIG. 3 is a flow chart illustrating a locating method of an operating body according to an embodiment of the invention. Steps S301 to S304 illustrated in FIG. 3 may be considered as the step S201 provided in the previous embodiment shown in FIG. 2. With reference to FIG. 3, in step S301, the image that includes an operating body is derived, e.g., the image is derived from the image capturing unit of the locating point. In step S302, the bright dot information variation in each scan line corresponding to the operating body is derived by scanning the image along a direction sequentially with at least one scan line, and each of width values of the operating body in each scan line is derived according to the bright dot information correspondingly. In step S303, a relative variation level between each of the width values in the adjacent scan line is calculated sequentially. In step S304, when the relative variation level is less than a threshold, a locating point of the operating body is determined according to the scan line corresponding to the relative variation level which is less than the threshold and according to the width value corresponding to the scan line.

Figure 4A:
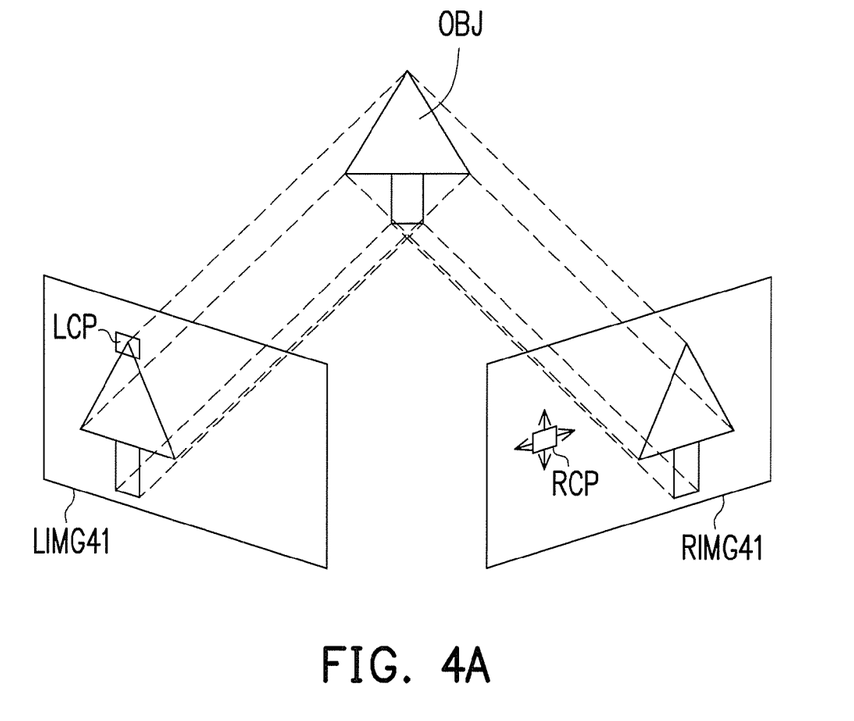
FIG. 4A is a schematic diagram illustrating relationship between an operating body and an image captured by an image capturing unit.

In the present embodiment, the step S301 of obtaining the image of the operating body includes light complement and image correction. FIG. 4A is a schematic diagram illustrating relationship between an operating body and an image captured by an image capturing unit. The images LIMG41 and RIMG41 are the images of the operating body OBJ (represented by arrows in FIG. 4A) which are captured by the image capturing devices 1101 and 1102, i.e., the images are directly captured without being processed) toward. In the present embodiment, a strong light beam from the image capturing devices 1101 and 1102 irradiates the operating body OBJ for shortening the exposure time of captured images, so that the obtained images LIMG41 and RIMG41 merely contain the operating body OBJ which undergoes the light complement, and the other objects in the obtained images LIMG41 and RIMG41 and the background become dark and blurry because of the lack of light complement. Accordingly, the desired determination on analyzing each of the images may be simplified. However, the step of obtaining the image containing the operating body OBJ which undergoes light complement may be performed selectively, or another step is performed to ensure that the images LIMG 41 and RIMG41 merely include a single operating body OBJ. The invention is not limited thereto. In the present embodiment, the bright dot information includes the position and the brightness (i.e., the gray values) of the scanning point (with high brightness) in each scan line. In the present embodiment, since the object OBJ subject to light complement is brighter than the other objects in the images LIMG41 and RIMG41, the bright dot information may reflect the position of the object OBJ and the width of the object OBJ in a single scan line.

Figure 4B:
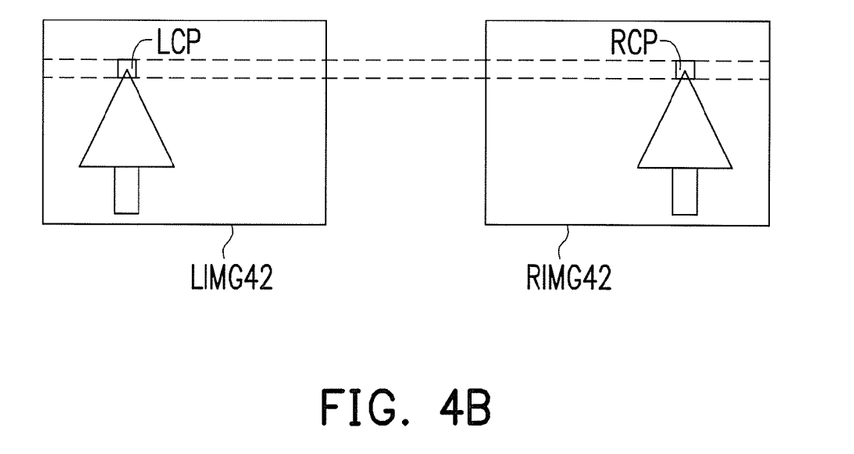
FIG. 4B is a schematic diagram illustrating a corrected image according to an embodiment of the invention.

In order to economize the use of the memory in the locating step, the images LIMG41 and RIMG41 are further corrected after the operating body OBJ undergoes light complement to derive the image that includes the operating body OBJ as shown in FIG. 4A. FIG. 4B is a schematic diagram illustrating a corrected image according to an embodiment of the invention. With reference to FIGS. 4A and 4B, during the image correction, a correcting point on the operating body must be found. In the present embodiment, the correcting point LCP is found on the operating body OBJ in the image LIMG41, and a correcting point RCP corresponding to the correcting point LCP is found on the operating body OBJ in the image RIMG41. Next, the images LIMG41 and RIMG41 are corrected through making the correcting point LCP parallel to the correcting point RCP, such that the images LIMG41 and RIMG41 shown in FIG. 4B are obtained.

Figure 5A:
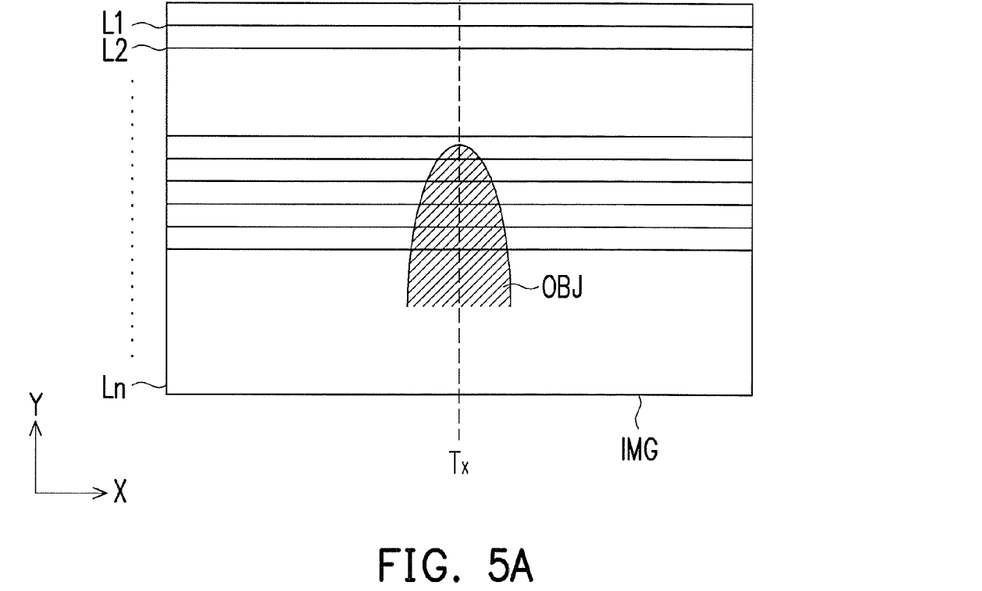
FIG. 5A is a schematic diagram illustrating relationship between scan lines of an image and an operating body in the image.
Figure 5B:
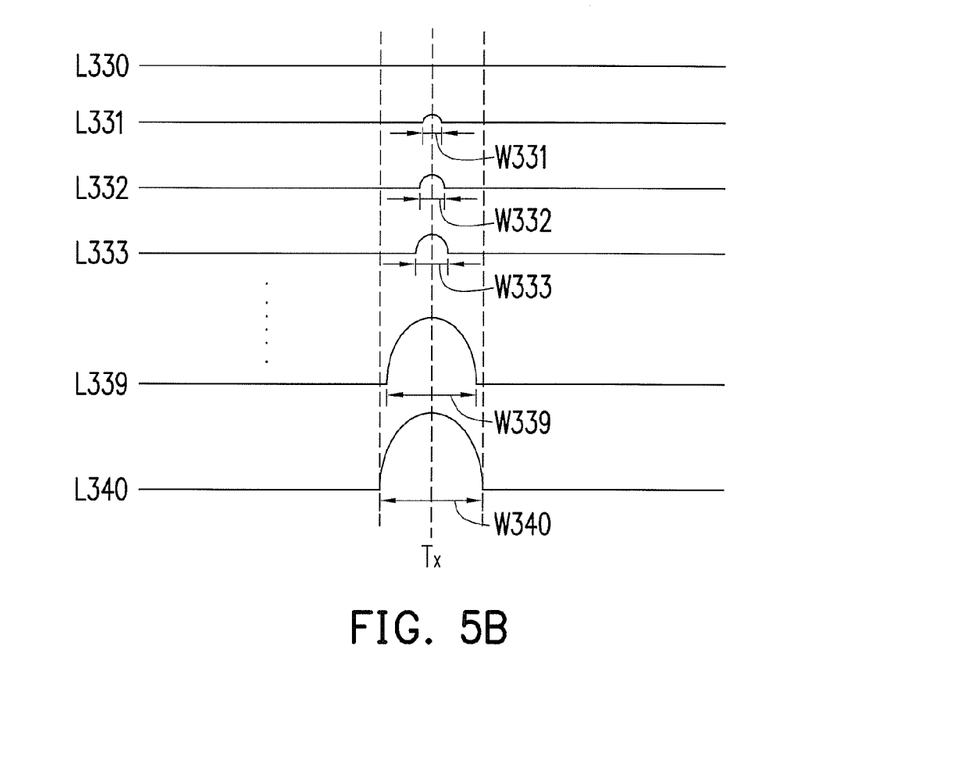
FIG. 5B is a schematic partial diagram illustrating bright dot information of each scan line.

As shown in FIG. 3, in steps S302 to S304, the operating body OBJ in the image LIMG42 or RIMG42 is transversely scanned sequentially, so as to determine the locating point of the operating body OBJ. FIG. 5A is a schematic diagram illustrating relationship between scan lines of an image and an operating body in the image, and FIG. 5B is a schematic partial diagram illustrating the bright dot information of each scan line. Here, the image IMG may be one of the images LIMG42 and RIMG42m as shown in FIG. 4B. In step S302, the image IMG is transversely scanned sequentially according to each of the scan lines L1 to Ln, and each of the width values of the operating body OBJ in each of the scan lines L1 to Ln is obtained according to the bright dot information indicating the brightness variation generated by each of the scan lines L1 to Ln in the image IMG. Since the image LIMG42 or the image RIMG42 merely includes the operating body OBJ when the images are captured, the bright dots indicating the brightness variation found during said sequential scan correspond to the operating body OBJ. In the present embodiment, note that the horizontal direction of the image IMG is defined as x-axis, and the vertical direction of the image IMG is defined as y-axis. The locating point may be shown as coordinates of the x-axis and the y-axis. The number of the scan lines may correspond to the vertical pixels of the image IMG, e.g., one scan line corresponds to one pixel. The scanning order may be along the y-axis in an upward or downward manner; for example, a scan line is scanned from left to right (along the x-axis) in unit of pixel, after the scan line is completely scanned, another scan line which is one pixel below the scan line will be scanned. In other embodiments of the operating device OBJ in different types, the obtained image may be vertically scanned sequentially.

The bright dot information of the scan lines L1-Ln is shown in FIG. 5B. In the present embodiment, starting from the scan line L331, the bright dot information gradually appears around the horizontal position Tx, and the width W331 may be simultaneously obtained from the variations in the bright dot information (e.g., peak values, delays, and so on). The width and the corresponding cross-sectional contour of the operating body OBJ on the scan line L331 refer to the width of the operating body on the scan line L331.

Next, in step S304, the relative variation level of each of the width values in the adjacent scan line is calculated sequentially, e.g., the relative variation level between the width value W332 and width value W333 is compared, the relative variation level between the width value W333 and width value W334 is compared, and so on. In step S304, when the relative variation level is less than the threshold, the locating point is determined according to the scan line and the width value corresponding to the relative variation level. For example, in the present embodiment, when the relative variation level between the width value W339 (corresponding to the scan line L339) and the width value W340 (corresponding to the scan line L340) is less than the threshold, the x-axis of the locating point is determined corresponding to the x-axis position Tx (i.e., the central position corresponding to the bright dot information on the scan line L340), and the y-axis coordinate of the locating point is determined corresponding to the scan line L340. When the relative variation level between the width values (e.g., W330 to W340) is less than the threshold, the width value is close to the width of the operating body (e.g., at the central position of the finger nail or the first knuckle of the finger). In an embodiment of the invention, the locating point is of the operating body is defined as the above position. After the locating point is obtained, step S201 is completed.

It should be mentioned that when the scan lines are scanned in an order from the scan line L339 to the scan line L340, the peak values of the bright dots tend to become consistent; therefore, whether the relative variation level of the width value is less than the threshold or not is determined. If necessary, whether the relative variation of the peak value is also less than another pre-set threshold or not may also be determined, so as to further confirm and guarantee that the correct scan line may be selected and the locating point of the operating body may be located.

Figure 6:
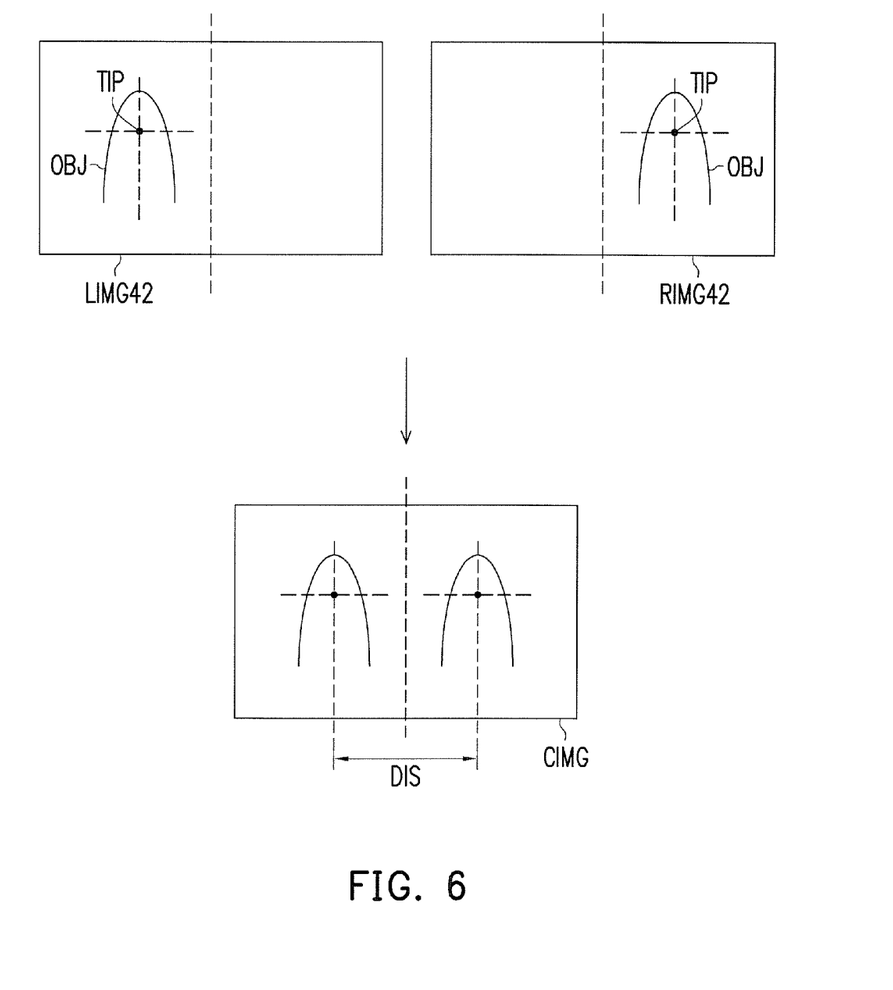
FIG. 6 is a schematic diagram illustrating an operating body in an image and a locating point of an operating body according to an embodiment of the invention.

Next, in step S202, the parallax between two image capturing devices 1101 and 1102 in the image capturing unit 110 is calculated according to said image and the determined locating point. FIG. 6 is a schematic diagram illustrating an operating body in an image and a locating point of an operating body according to an embodiment of the invention. In the present embodiment, the steps S302 to S304 illustrated in FIG. 3 are performed to process the images LIMG42 and RIMG42 (as shown), so as to find the locating point TIP of the operating body OBJ in the images LIMG42 and RIMG42. In step S202, after the locating point of the operating body OBJ in the images LIMG42 and RIMG42 is obtained, the images LIMG42 and RIMG42 are combined into an image CIMG, and the distance between two locating points TIP is the parallax DIS. In some cases, the operating body OBJ in the images LIMG42 and RIMG 42 may be overlapped after the combined image CIMG is generated, which however does not affect the calculation of the parallax as described above. When the two locating points TIP are overlapped, it means that the parallax DIS is zero. On the other hand, if the images are not corrected when the images are captured in step S201, the connecting line between the two locating points TIP may be skewed.

After the parallax DIS between the two images LIMG42 and RIMG42 is obtained, the distance (or referred to as a displacement distance) between the operating body OBJ and the image capturing unit 110 is determined according to the parallax, and then the depth data are generated according to the distance (step S203 as illustrated in FIG. 2).

Figure 7:
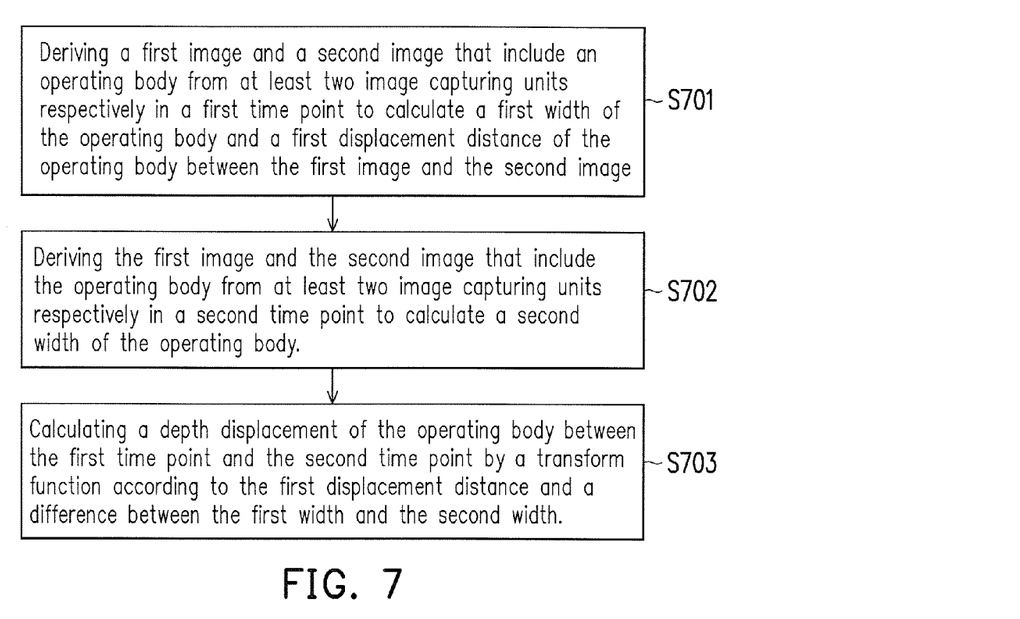
FIG. 7 is a flow chart diagram illustrating a depth determining method according to an embodiment of the invention.

FIG. 7 is a flow chart diagram illustrating a depth determining method according to an embodiment of the invention. The steps S701 to S703 illustrated in FIG. 7 may be considered as a detailed embodiment of the step S203 illustrated in FIG. 2. In such an embodiment, the operating body is moved along the depth direction. With reference to FIG. 7, in step S701, the first image and the second image that include the operating body are derived from at least two image capturing units respectively in the first time point to calculate the first width of the operating body and the first displacement distance of the operating body between the first image and the second image. In step S702, the first image and the second image that include the operating body are derived from at least two image capturing units respectively in the second time point to calculate the second width of the operating body. In step S703, a displacement depth of the operating body between the first time point and the second time point is calculated by a transform function according to the first displacement distance and a difference between the first width and the second width.

The at least two image capturing units may also be the two image capturing devices 1101 and 1102 in a single image capturing unit as illustrated in FIG. 1. The first image and the second image are respectively the images LIMG42 and RIMG42 as illustrated in FIG. 4B (or FIG. 6). The first width and the second width are respectively the width of the operating body OBJ (e.g., the width W340 as illustrated in FIG. 5B) in the first image and the second image in the first time point and the second time point.

Figure 8:
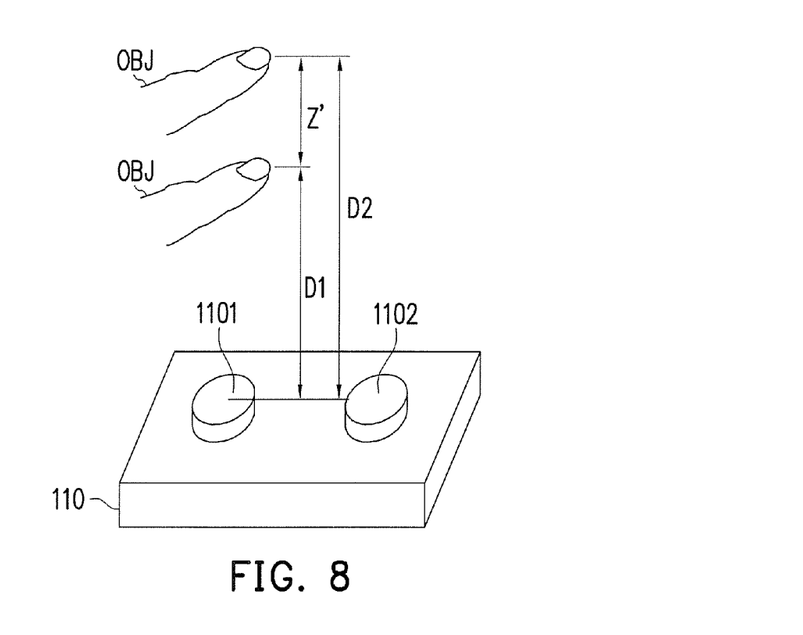
FIG. 8 is a schematic diagram illustrating a position of the operating body in a first time point and a second time point according to an embodiment of the invention.

FIG. 8 is a schematic diagram illustrating a position of the operating body in a first time point and a second time point according to an embodiment of the invention. With reference to FIG. 8, the operating body OBJ is located in the distance D1 away from the image capturing unit 110, and the distance D1 may be obtained in view of the previous embodiments depicted in FIG. 1 to FIG. 7 by means of the parallax DIS of the image which is captured by the image capturing devices 1101 and 1102 in the first time point t. Similarly, the operating body OBJ is located in the distance D2 away from the image capturing unit 110, and the distance D2 may be obtained in view of the previous embodiments depicted FIG. 1 to FIG. 7 by means of the parallax DIS of the image which is captured by the image capturing devices 1101 and 1102 in the second time point (t+1).

However, since the distance D2 is farther away from the image capturing unit 110 than the distance D1, calculations made under said circumstances may not be accurate (i.e., the farther the operating body OBJ away from the image capturing unit 110, the less the parallax generated by the image capturing devices 1101 and 1102). Therefore, in the present embodiment, the distance D2 may be obtained by means of the following formula (1):

$$D2=D1+Z' \quad (1)$$

Here, Z' is the displacement depth of the operating body between the first time point and the second time point. The displacement depth may be obtained by means of the following formula (2):

$$Z'=f(DIS,d'), \text{ wherein } d'=|(w_{t+1}-w_t)| \quad (2)$$

Here, $w_{t+1}$ and $w_t$ are the width of the operating body in the image LIMG42 (or the image RIMG 42) in the second time point (t+1) and the first time point t, respectively, and d' is the width difference of the operating body OBJ between the second time point (t+1) and the first time point t. On the other hand, f may be a transform function for transforming the parallax and the width difference to the displacement depth. It is rather simple to implement the transform function f by creating the corresponding lookup table of the displacement depth according to the parallax and the width difference; although doing so may consume significant memory space, the complexity of calculations may be reduced.

For example, when the image capturing unit 110 illustrated in FIG. 8 is actually used, the size of the operating body OBJ is 1 cm, the parallax is 5 cm, the view angles VA1 and VA2 of the image capturing devices 1101 and 1102 are 30 degrees, respectively, and the dpi of the image capturing devices 1101 and 1102 is 1280*720 pixels. If the distance D1 between the operating body OBJ and the image capturing unit 110 is 5 cm in the first time point t, and the width $w_t$ of the operating body OBJ is 489 pixels. Furthermore, in the second time point (t+1), if the calculated width difference d' of the operating body between the first time point t and the second time point (t+1) is 10 pixels, the displacement depth Z' between the first time point t and the second time point t+1 is equal to 0.1 cm. This may be derived from the following table 1 (containing parts of the contents of said lookup table).

TABLE 1

| DIS = 5 cm, $w_t$ = 489 | |
|---|---|
| d' | Z' |
| 10 pixels | 0.1 cm |
| 19 pixels | 0.2 cm |
| 27 pixels | 0.3 cm |

If the width $w_{t+1}$ of the operating body OBJ in the second time point (t+1) is greater than the width $w_t$ in the first time point t, the displacement depth Z' has a positive value, and the distance D1 is equal to 5+0.1=5.1 cm. On the contrary, if the width $w_{t+1}$ of the operating body OBJ in the second time point (t+1) is less than the width $w_t$ in the first time point t, the displacement depth Z' has a negative value, and the distance D2 is equal to 5−0.1=4.9 cm.

When the parallax is 10 cm, if the distance D1 measured in the first time point t between the operating body OBJ and the image capturing unit 110 is 5 cm, the width of the operating body OBJ is 245 pixels. Furthermore, in the second time point (t+1), the width difference of the operating body between the first time point t and the second time point (t+1) is calculated, and the calculated width difference is 19 pixels; thereby, the displacement depth Z' between the first time point t and the second time point (t+1) is equal to 0.2 cm. This may also be derived from the following table 2 (containing parts of the contents of said lookup table).

TABLE 2

| DIS = 10 cm, $w_t$ = 245 | |
|---|---|
| d' | Z' |
| 3 pixels | 0.1 cm |
| 5 pixels | 0.2 cm |
| 7 pixels | 0.3 cm |

If the width $w_{t+1}$ of the operating body OBJ in the second time point t+1 is more than the width $w_t$ in the first time point t, the displacement depth Z' has a positive value, and the distance D1 is equal to 5+0.2=5.2 cm. On the contrary, if the width $w_{t+1}$ of the operating body OBJ in the second time point t+1 is less than the width $w_t$ in the first time point t, the displacement depth Z' has a negative value, and the distance D2 is equal to 5−0.2=4.8 cm.

Figure 9:
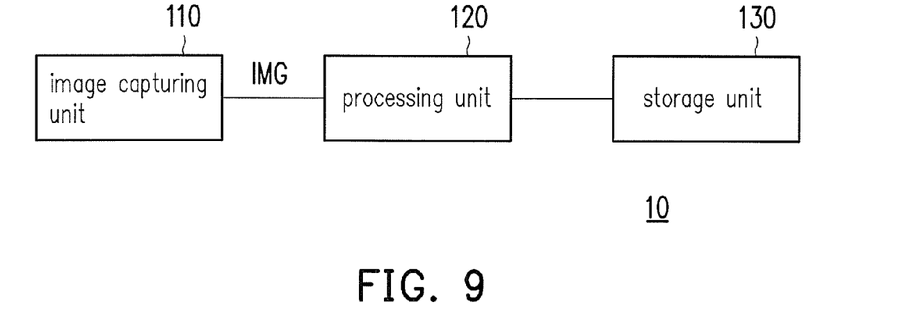
FIG. 9 is a block diagram illustrating a locating device of an operating body according to an embodiment of the invention.

An embodiment of the invention further provides a locating device which may be used to execute the locating method and the depth determining method of the operating body, as illustrated in FIG. 1 to FIG. 8. FIG. 9 is a block diagram illustrating a locating device of an operating body according to an embodiment of the invention. With reference to FIG. 9, the locating device 10 of the operating body includes an image capturing unit 110 and a processing unit 120. The image capturing unit 110 captures an image IMG that includes the operating body. The processing unit 120 receives and scans the image IMG transversely according to each scan line in the image IMG, derives each width value of the operating body in each scan line according to the bright dot information of each scan line in the image IMG, and calculates a relative variation level between each width value in the adjacent scan line sequentially. When the relative variation level is less than a threshold, the processing unit 120 determines a locating point of the operating body according to the scan line and the width value corresponding to the relative variation level.

In an embodiment of the invention, the locating device 10 further includes a storage unit 130 which is coupled to the processing unit 120. When the relative variation level is less than a threshold, the processing unit 120 may record the locating point of the operating body and the width thereof into the storage unit 130 according to the corresponding width value of the relative variation level.

Besides, the locating device 10 may also be a depth determining device. The processing unit 120 derives a first image and a second image that include the operating body from at least two image capturing units (e.g., the image capturing devices 1101 and 1102 of the image capturing unit 110) in a first time point to calculate a first width of the operating body and a first displacement distance of the operating body between the first image and the second image. The processing unit 120 derives the first image and the second image that include the operating body from at least two image capturing units as described above in a second time point to calculate a second width of the operating body. The processing unit 120 makes use of a transform function to calculate the displacement depth of the operating body between the first time point and the second time point according to the first displacement distance and the difference between the first width and the second width.

The way to implement the locating device 10 and the way to implement the locating device 10 when the locating device 10 is a depth determining device may be referred to as the embodiments shown in FIG. 1 to FIG. 8 and thus will not be repeated hereinafter.

Note that the processing unit 120 may be a physical circuit and may also be achieved in form of a processor which executes the specific code. Besides, when the locating device 10 is set in an electronic device, the processing unit 120 is configured together with the CPU of the electronic device or other processing units; however, the invention is not limited thereto.

To sum up, embodiments of the invention provide a locating method of the operating body, a locating device, a depth determining method, and a depth locating device for obtaining the corresponding locating point of the operating body rapidly through transverse scanning and determining the distance between the operating body and the locating device. Moreover, when the operating body moves, especially moving along the depth direction, the corresponding depth and the displacement may be learned accurately. Even in case that the operating body is far away from the locating device, and the resultant parallax generated by movement along the depth direction, the correct depth and the correct displacement of the operating body may still be learned, given that the depth determining method described in the invention is applied. As a result, the motions of the operating body may be determined correctly.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A depth determining method of an operating body comprising:
   deriving a first image and a second image that include the operating body from at least two image capturing units respectively to calculate a first width of the operating body in a first time point comprising:
      transversely scanning the first image and the second image received in the first time point along a direction sequentially with a plurality of scan lines for deriving bright dot information in each scan line corresponding to the operating body, and deriving the first width of the operating body along each scan line according to the bright dot information in the corresponding scan line;
   sequentially comparing the first width of the operating body along a first scan line with the first width of the operating body along another first scan line next to the first scan line along the direction in the first image, wherein the plurality of scan lines comprises the first scan line and the another first scan line;
   when a first relative variation level between the first width of the operating body in the first scan line and the first width of the operating body in the another first scan line is less than a threshold, determining a first locating point in the first image for indicating where the operating body located in the first image according to the another first scan line;
   sequentially comparing the first width of the operating body along a second scan line with the first width of the operating body along another second scan line next to the second scan line along the direction in the second image, wherein the plurality of scan lines comprises the second scan line and the another second scan line;
   when a second relative variation level between the first width of the operating body in the second scan line and the first width of the operating body in the another second scan line is less than the threshold, determining a second locating point in the second image for indicating where the operating body located in the second image according to the another second scan line;
   calculating a first displacement distance of the operating body between the first image and the second image in the first time point according to the first locating point and the second locating point;
   deriving the first image and the second image that include the operating body from the at least two image capturing units respectively to calculate a second width of the operating body in a second time point later than the first time point comprising:
      transversely scanning the first image and the second image received in the second time point in the direction sequentially with a plurality of other scan lines for deriving bright dot information in each other scan line corresponding to the operating body, and deriving the second width of the operating body along each other scan line according to the bright dot information in the corresponding other scan line in the second time point;

calculating a displacement depth of the operating body between the first time point and the second time point by a first transform function, wherein the displacement depth is a difference between a depth of the operating body in the second time point and a depth of the operating body in the first time point, wherein the first transform function is a transform function for transforming the first displacement distance and a width difference to the displacement depth, and wherein the width difference is a difference between the first width and the second width;

obtaining a first distance of the operating body, wherein the first distance is a distance between the operating body and a connecting line between the at least two image capturing units at the first time point, and wherein the first distance is calculated based on the parallax of the first image and the second image; and calculating a second distance of the operating body, wherein the second distance is a distance between the operating body and the connecting line between the at least two image capturing units at the second time point, and wherein the second distance is a calculated sum of the first distance and the displacement depth determined by the first transform function.

2. The depth determining method of the operating body according to claim 1, wherein the transform function establishes a lookup table of the displacement depth according to a corresponding parallax and a corresponding width difference.

3. The depth determining method of the operating body according to claim 1, wherein when the second width is greater than the first width, a value of the displacement depth is positive, and wherein when the second width is less than the second width, the value of the displacement depth is negative.

4. A depth determining device of an operating body comprising:
a first image capturing unit configured to capture a first image that includes the operating body;
a second image capturing unit configured to capture a second image that includes the operating body; and
a processing unit coupled to the first image capturing unit and the second image capturing unit,
wherein the processing unit derives a first image and a second image that include the operating body from at least two image capturing units respectively to calculate a first width of the operating body in a first time point by transversely scanning the first image and the second image received in the first time point along a direction sequentially with a plurality of scan lines for deriving bright dot information in each scan line corresponding to the operating body and deriving the first width of the operating body along each scan line according to the bright dot information in the corresponding scan line,
wherein the processing unit sequentially compares the first width of the operating body along a first scan line with the first width of the operating body along another first scan line next to the first scan line along the direction in the first image, wherein the plurality of scan lines comprises the first scan line and the another first scan line,
wherein when a first relative variation level between the first width of the operating body in the first scan line and the first width of the operating body in the another first scan line is less than a threshold, the processing unit determines a first locating point in the first image for indicating where the operating body located in the first image according to the another first scan line,
wherein the processing unit sequentially compares the first width of the operating body along a second scan line with the first width of the operating body along another second scan line next to the second scan line along the direction in the second image, wherein the plurality of scan lines comprises the second scan line and the another second scan line,
wherein when a second relative variation level between the first width of the operating body in the second scan line and the first width of the operating body in the another second scan line is less than the threshold, the processing unit determines a second locating point in the second image for indicating where the operating body located in the second image according to the another second scan line,
wherein the processing unit calculates a first displacement distance of the operating body between the first image and the second image in the first time point according to the first locating point and the second locating point,
wherein the processing unit derives the first image and the second image that include the operating body from the at least two image capturing units respectively to calculate a second width of the operating body in a second time point later than the first time point by transversely scanning the first image and the second image received in the second time point in the direction sequentially with a plurality of other scan lines for deriving bright dot information in each other scan line corresponding to the operating body and deriving the second width of the operating body along each other scan line according to the bright dot information in the corresponding other scan line in the second time point,
wherein the processing unit calculates a displacement depth of the operating body between the first time point and the second time point by a first transform function, wherein the displacement depth is a difference between a depth of the operating body in the second time point and a depth of the operating body in the first time point, wherein the first transform function is a transform function for transforming the first displacement distance and a width difference to the displacement depth, and wherein the width difference is a difference between the first width and the second width,
wherein the processing unit obtains a first distance of the operating body, wherein the first distance is a distance between the operating body and a connecting line between the at least two image capturing units at the first time point, and wherein the first distance is calculated based on the parallax of the first image and the second image, and
wherein the processing unit calculates a second distance of the operating body, wherein the second distance is a distance between the operating body and the connecting line between the at least two image capturing units at the second time point, and wherein the second distance is a calculated sum of the first distance and the displacement depth determined by the first transform function.

5. The depth determining device of the operating body according to claim 4, wherein the transform function establishes a lookup table of the displacement depth according to a corresponding parallax and a corresponding width difference.

\* \* \* \* \*